Figure 1:
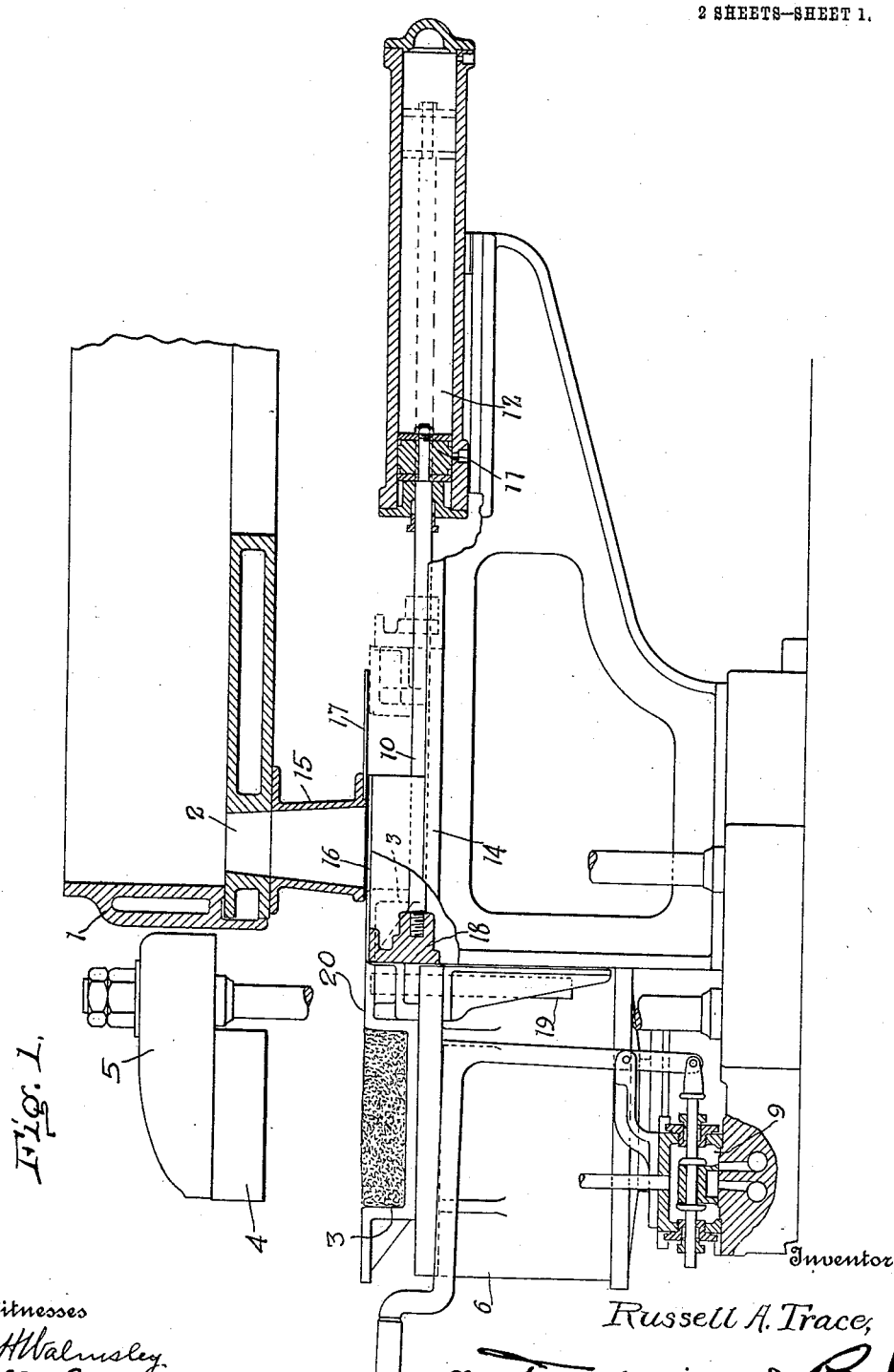

R. A. TRACE.
CAKE FORMER.
APPLICATION FILED NOV. 10, 1913.

1,095,750.

Patented May 5, 1914.
2 SHEETS—SHEET 1.

Witnesses
G. H. Walmsley
H. L. Hammaker.

Inventor
Russell A. Trace,
By Toulmin & Toulmin
Attorneys

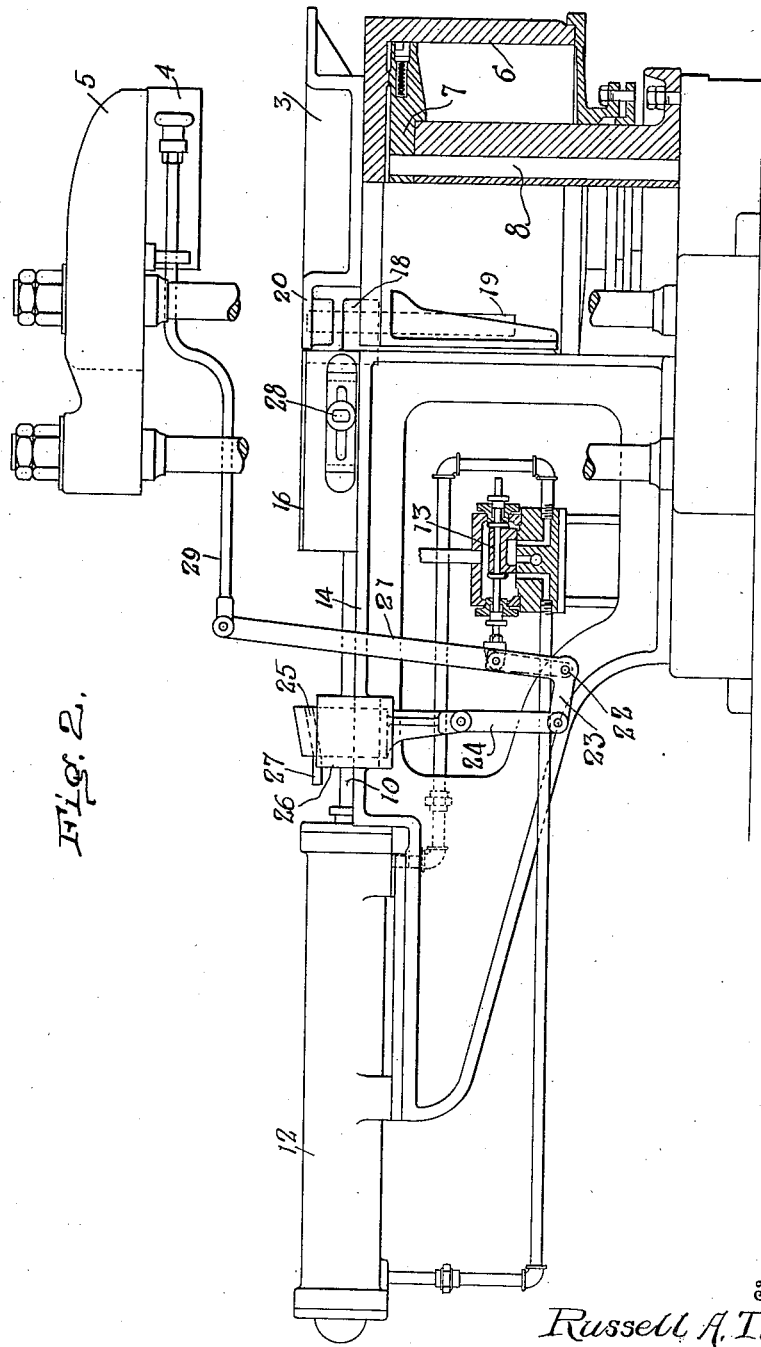

UNITED STATES PATENT OFFICE.

RUSSELL A. TRACE, OF DAYTON, OHIO, ASSIGNOR TO BUCKEYE IRON AND BRASS WORKS, OF DAYTON, OHIO, A CORPORATION OF OHIO.

CAKE-FORMER.

1,095,750. Specification of Letters Patent. Patented May 5, 1914.

Application filed November 10, 1913. Serial No. 800,018.

*To all whom it may concern:*

Be it known that I, RUSSELL A. TRACE, a citizen of the United States, residing at Dayton, in the county of Montgomery and State of Ohio, have invented certain new and useful Improvements in Cake-Formers, of which the following is a specification, reference being had therein to the accompanying drawing.

This invention relates to cake formers such as are used for preparing cakes of cotton seed meal or the like for the oil press. For many years past it has been the custom to install a cake former adjacent to the cooker or heater in which the seeds or meal are treated preparatory to the extraction of the oil therefrom. To transfer the meal from the heater to the cake former the lowermost receptacle of the heater, which is the only one that need be considered here, is provided with an outlet opening in the bottom wall thereof and there is slidably mounted on a suitable support beneath the heater a conveyer or hopper adapted to be moved beneath the opening in the heater receptacle and then moved laterally to cause the same to discharge into the receiver which forms part of the cake-forming device. The hopper is preferably open at the top and bottom and is provided with an apron at its rear upper edge to cut off the flow of meal from the heater. The support is provided with a plate which closes the bottom of the hopper while the latter is in receiving position but which terminates at the edge of the receiver of the cake former. As a result as soon as the forward edge of the hopper passes the end of the plate the meal will begin to discharge into the receiver. Inasmuch as the hopper is full the weight of the meal in the hopper will press the same tightly into that portion of the receiver which is first filled and as the hopper is moved across the receiver the quantity of meal in the hopper will diminish and the meal which enters that portion of the receiver which is last filled will not be subjected to the same amount of pressure as the meal that entered that part of the receiver which was filled. This results in an uneven distribution of the meal in the cake and a consequent unequal extraction of the oil when the cakes are acted upon by the oil presses. In some instances it has been found by actual test that at one edge of the cake there would remain not more than three per cent. of oil while at the other edge there would be as high as thirty-three per cent. of oil.

The object of the present invention is to secure an equal distribution of the meal in the receiver of the cake former in order that a maximum extraction of oil may be made from all parts of the cake.

In the accompanying drawings, Figure 1 is a side elevation, partly broken away, of a cake former and heater showing the means for filling the receiver of the cake former; and Fig. 2 is a similar view of the opposite side of the machine.

In carrying out my invention I so construct the cake former that the receiver thereof is capable of movement into and out of a position to receive the meal directly from the lower receptacle of the heater. In this manner I am enabled to maintain a substantially uniform pressure on the meal while it is being filled into the receiver and secure a uniform distribution of the meal in the receiver. Consequently, all parts of the cake thus formed will be subjected to equal pressure in the oil press and the oil will be removed from all parts thereof to a maximum extent. The movability of the receiver may be accomplished in various ways. In the present drawings I have shown the lower corner only of the lower receptacle of the heater 1, which receptacle is provided with a discharge opening 2. Arranged at one side of the heater is the cake former which comprises a receiver 3 and a forming head 4 which is adapted to enter the receiver to form the meal therein into a cake. In this particular type of cake former the forming head is mounted on a fixed support 5 above the receiver and the receiver is moved toward and away from the forming head. To this end the receiver is mounted upon a plunger 6 which is in the form of a cylinder extending about a fixed piston 7. The piston has a vertical conduit 8 communicating at its lower end with a controlling valve chamber 9 whereby the operating fluid may be admitted to the interior of the cylinder. This operating mechanism is not a part of the present invention and may be of any suitable type. The receiver 3 is slidably mounted upon the upper end of the plunger or cylinder 6 and is connected by means of a rod 10 with a piston 11 which is mounted in a cylinder 12 which has suitable connections with a supply of fluid under pressure for actuating the piston, the operation being controlled by a valve 13. Arranged adjacent to the plunger 6 of the cake former is a supporting table or track 14, the surface of which is in substantially the same plane with the supporting surface of the plunger and is adapted to receive and support the receiver 3 of the cake former when it is moved laterally. When it is desired to fill the receiver the piston 11 is operated to draw the receiver onto the supporting track 14 and beneath the discharge opening 2 of the heater receptacle. In the present instance this discharge opening is provided with a downwardly extending conduit 15 which enables the receiver to be placed some distance below the bottom of the heater which is a more convenient arrangement.

The receiver has a rearwardly projecting apron 16 which extends beneath the conduit 15 and closes the same at all times except when the receiver is beneath the conduit. As the receiver is moved laterally beneath the conduit 15 the meal will pass from the heater receptacle to the receiver. As here shown the receiver is of a greater width than the conduit but this is immaterial as the movement of the receiver will cause one side of the same to be filled before the other side. This, however, does not affect the distribution of the meal because the supply of meal within the heater is sufficient to maintain at all times a substantially equal pressure upon the meal which is discharged into the receiver and inasmuch as all of the meal in the receiver is at some time exposed to this pressure the meal will be equally distributed under a uniform pressure throughout the area of the receiver. As here shown the conduit 15 has a rearwardly extending apron 17 which covers the rear portion of the receiver when this extends beyond the conduit during the filling of the forward portion thereof. When the receiver has been filled the movement of the piston 11 in the cylinder 12 is reversed and the receiver returned to its position upon the plunger 6 of the cake former, which plunger is then actuated to move the meal upward against the forming head 4. The meal in the receiver is usually surrounded by a fabric which is folded over the same so as to completely inclose the finished cake ready for the oil press, but this forms no part of the present invention and is not here shown, as the operation of the press does not in any way depend upon the use of the fabric.

To permit the receiver to move upward independently of the piston rod 10 I have provided a sliding connection between the piston rod and the receiver. The piston rod is connected to a head 18 having a vertical opening to receive a pin 19 rigidly secured to and depending from a flange 20 rigidly secured to and forming a part of the receiver. The length of this pin is such that it will not be withdrawn from the apertured head 18 when the receiver is moved to the uppermost limit of its movement. I have also provided means for automatically actuating the valve 13 to reverse the direction of movement of the piston 11 in the cylinder 12 and cause the receiver to return to its normal position after it has been filled. To this end the valve stem of the valve 13 is connected to a lever 21 which is pivotally mounted on a fixed axis at 22 and provided with a forwardly projecting arm 23. This arm is connected by a link 24 with a vertically movable member 25 which is here shown as slidably mounted in a guideway 26 and as having an overhanging flange 27, which flange is arranged at an inclination to and in the path of a projection 28 carried by a part connected with the receiver. This projection is so arranged with relation to the movable member 25 that the projection 28 will engage the inclined flange 27 to actuate the member 25, lever 21 and valve 13 as soon as the forward portion of the receiver has been brought beneath the conduit 15. The lever 21 also has a forwardly projecting handle 29 by means of which the valve can be manually operated to start the movement of the receiver.

It is thought the operation of the device will be readily understood from the foregoing description and it will be apparent that the manner of filling the receiver is such as to secure the much desired equal distribution of the meal therein.

While I have shown and described one embodiment of my invention it will be understood that the same has been chosen for the purpose of illustration only and that I do not desire to be limited to the details of construction shown and described, for obvious modifications will occur to a person skilled in the art.

Having thus fully described my invention, what I claim as new and desire to secure by Letters Patent, is:—

1. The combination, with a receptacle to contain meal and having a discharge opening, of a cake former arranged adjacent to said discharge opening and comprising a receiver and a forming head, said receiver being capable of lateral reciprocatory movement to enable it to be moved either into a position to receive meal from said discharge opening or into alinement with said forming head.

2. The combination, with a receptacle to contain meal and having a discharge opening, and a conduit extending downward from said discharge opening, of a cake former comprising a receiver, and a forming head coöperating therewith, a supporting track extending beneath said conduit and adapted to support said receiver, means to move said receiver back and forth along said track to bring it into alinement with either said conduit or said forming head.

3. The combination, with a receptacle to contain meal and having a discharge opening, of a cake former comprising a receiver and a forming head, the receiver being capable of movement toward and away from said forming head, and means for imparting to said receiver lateral reciprocatory movement to bring the same alternately into alinement with the discharge opening of said receptacle and with said forming head.

4. The combination, with a receptacle to contain meal and having a discharge opening, of a cake former comprising a receiver, and a forming head, a plunger to move said receiver toward and away from said forming head, said receiver being slidably mounted on said plunger, and a support for said receiver extending from said plunger to a position beneath said discharge opening, whereby said receiver may be moved into alinement with either said opening or said forming head.

5. The combination, with a receptacle to contain meal and having a discharge opening, of a cake former comprising a forming head, and a receiver movable toward and away from said forming head and capable of lateral movement relatively thereto, operating mechanism to impart lateral movement to said receiver, and a sliding connection between said operating mechanism and said receiver and to permit the latter to move vertically independently of said operating mechanism.

6. The combination, with a receptacle to contain meal and having a discharge opening, of a cake former arranged adjacent to said discharge opening and comprising a receiver, means for moving said receiver laterally to bring the same into a position beneath said discharge opening, and means to automatically control the lateral movement of said receiver.

7. The combination, with a heater having a discharge opening in the bottom wall thereof, a cake former arranged adjacent to said heater and comprising a receiver, and a forming head coöperating with said receiver to form a cake therein, a plunger to impart vertical movement to said receiver, said receiver being mounted for transverse movement on said plunger, a support arranged adjacent to said plunger and beneath the discharge opening in said heater, and means for moving said heater onto said support to enable it to receive the material from said heater.

In testimony whereof, I affix my signature in presence of two witnesses.

RUSSELL A. TRACE.

Witnesses:
GEORGE A. SAUER, Jr.,
F. W. SCHAEFER.